United States Patent
Van Heugten

(10) Patent No.: US 9,712,738 B2
(45) Date of Patent: Jul. 18, 2017

(54) SYSTEMS, DEVICES, AND METHODS FOR MANAGING CAMERA FOCUS

(71) Applicant: e-Vision Smart Optics, Inc., Sarasota, FL (US)

(72) Inventor: Anthony Van Heugten, Sarasota, FL (US)

(73) Assignee: e-Vision Smart Optics, Inc., Sarasota, FL (US)

(*) Notice: Subject to any disclaimer, the term of this patent is extended or adjusted under 35 U.S.C. 154(b) by 0 days.

(21) Appl. No.: 14/388,912

(22) PCT Filed: Apr. 11, 2013

(86) PCT No.: PCT/US2013/036122
§ 371 (c)(1),
(2) Date: Sep. 29, 2014

(87) PCT Pub. No.: WO2013/158456
PCT Pub. Date: Oct. 24, 2013

(65) Prior Publication Data
US 2015/0085179 A1    Mar. 26, 2015

Related U.S. Application Data

(60) Provisional application No. 61/625,176, filed on Apr. 17, 2012.

(51) Int. Cl.
*G03B 13/00* (2006.01)
*H04N 9/73* (2006.01)
(Continued)

(52) U.S. Cl.
CPC .......... *H04N 5/23212* (2013.01); *G02B 7/38* (2013.01); *G02B 27/0075* (2013.01)

(58) Field of Classification Search
CPC ............. H04N 5/23212; H04N 5/3656; H04N 5/3696; H04N 5/23258; H04N 5/23287; G02B 27/0075; G02B 27/00; G02B 7/38; G03B 13/36
USPC ........ 348/208.12, 220.1, 345, 348–357, 361; 359/221.2, 245, 290, 294, 322, 421, 422, 359/655
See application file for complete search history.

(56) References Cited

U.S. PATENT DOCUMENTS 4,789,227 A * 12/1988 Tanaka ................. G02B 15/173
359/683
6,693,672 B1    2/2004 Oliver
(Continued)

FOREIGN PATENT DOCUMENTS

| GB | 2492269 | 12/2012 |
| JP | 2009206831 | 9/2009 |
| WO | WO2012/048431 | 4/2012 |

*Primary Examiner* — Lin Ye
*Assistant Examiner* — Euel Cowan
(74) *Attorney, Agent, or Firm* — Michael Haynes PLC; Michael N. Haynes

(57) ABSTRACT

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, via a device comprising an electro-active lens, automatically acquiring at least two images of a scene.

26 Claims, 5 Drawing Sheets

(51) Int. Cl.
    *H04N 5/225*     (2006.01)
    *H04N 5/232*     (2006.01)
    *G02B 27/00*     (2006.01)
    *G02B 7/38*     (2006.01)

(56) References Cited

U.S. PATENT DOCUMENTS

| | | | |
|---|---|---|---|
| 2003/0118245 A1* | 6/2003 | Yaroslavsky | G06T 1/0007 382/255 |
| 2005/0264678 A1 | 12/2005 | Butterworth | |
| 2008/0013941 A1 | 1/2008 | Daley | |
| 2008/0019680 A1* | 1/2008 | Kasahara | G03B 7/08 396/48 |
| 2008/0144185 A1* | 6/2008 | Wang | G02B 3/14 359/665 |
| 2008/0208335 A1* | 8/2008 | Blum | A61F 2/1616 623/6.22 |
| 2008/0218613 A1 | 9/2008 | Janson | |
| 2009/0091633 A1* | 4/2009 | Tamaru | G02B 7/38 348/208.14 |
| 2010/0165152 A1* | 7/2010 | Lim | G06T 5/50 348/240.99 |
| 2011/0217030 A1 | 9/2011 | Muench | |
| 2011/0292266 A1* | 12/2011 | Duston | G02B 3/14 348/308 |
| 2012/0062784 A1 | 3/2012 | Van Heugten | |
| 2012/0327195 A1* | 12/2012 | Cheng | H04N 5/23212 348/47 |
| 2013/0188019 A1* | 7/2013 | Christopher | H04N 13/0235 348/46 |
| 2013/0238090 A1* | 9/2013 | Pugh | G02B 26/005 623/6.13 |

* cited by examiner

SYSTEMS, DEVICES, AND METHODS FOR MANAGING CAMERA FOCUS

CROSS-REFERENCES TO RELATED APPLICATIONS

This application claims priority to, and incorporates by reference herein in its entirety, pending U.S. Provisional Patent Application 61/625,176, filed 17 Apr. 2012.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Figure 1:
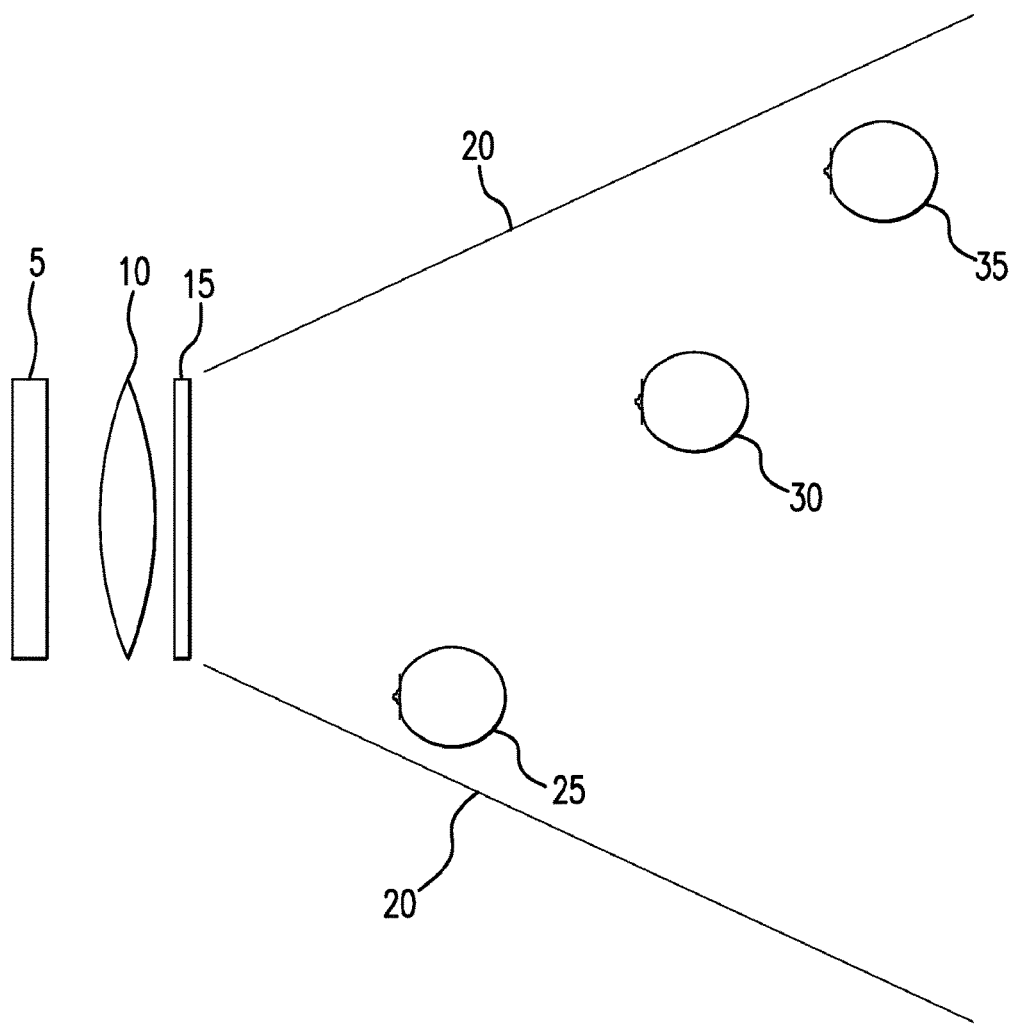
FIG. 1 is a top view of an exemplary embodiment of a system.

It would be desirable if a user of a camera did not have to focus upon any object and instead could simply point and shoot without regard to focus. It would also be desirable if photographs were taken such that the far, near, and intermediate objects could all be captured so they were each in focus in the photograph, without the user having to decide during the time that the photograph was being taken which of those objects must be in focus, and/or could later decide what objects in the photograph to bring into focus.

Certain exemplary embodiments can provide a system that can allow the user to take a photograph without regard for focus, allow the user to select the point of focus after shooting the photograph, not degrade or cause the image resolution to be substantially below that of the image sensor resolution, and/or not allow excessive time to pass between individual image acquisitions during the image acquisition process that would cause unacceptable motion blur.

Electro-active lenses are a type of optic that can change their optical power quickly, and much quicker than conventional mechanical devices used in cameras today. Harnessing the potential ability for an electro-active lens to change optical power quickly can make possible the previously impossible prospect of taking a sequence of images at various focus points and automatically adjusting focus afterward, while being less sensitive to motion of the objects being photographed.

An exemplary electro-active lens used for focus can be constructed from two clear substrates oriented substantially parallel and substantially adjacent to each other, with liquid crystal sandwiched and sealed in between the substrates. On the inside surface of one substrate can be a solid coating of a clear, electrically conductive material, for example indium tin oxide. On the opposite facing substrate can be a series of concentric ring electrodes, which can be made from a clear, electrically conductive material. Electrical connections can be made to the concentric ring electrodes, and a voltage profile can be applied such that there is a gradient of voltage potential between the ring electrodes and the opposite substrate. As more voltage is applied, the liquid crystal molecules can change orientation from being parallel to the substrate to becoming more perpendicular to the substrate, and a resulting change in the index of refraction can occur. For example, eight concentric rings might have a voltage of approximately 1 volt applied to the inside center ring, then a progressively higher voltage applied to the subsequent rings that are further outward from the center, such that ring one would be approximately 1 volt, ring two would be approximately 1.5 volts, ring three approximately 2.0 volts, and so forth, with ring eight being approximately 4.5 volts. The time for the liquid crystal to reorient itself from being substantially parallel to the substrate to being more perpendicular to the substrate can vary according to the voltage being applied. A higher voltage can cause a faster switching time. Therefore, to speed up the process of rotating the liquid crystal molecules, a higher voltage can be applied to each ring for a short period of time to cause the molecules to turn faster, then the voltage can be reduced to its holding voltage once the molecules have reached their desired angle. For example, ring one can have a higher voltage of approximately 2 volts to approximately 40 volts applied to it for approximately 1 to approximately 50 milliseconds, then changed to approximately 1 volt of holding voltage immediately after the allotted time period of applying the higher voltage is complete. Simultaneously, ring two can have approximately 2 to approximately 40 volts applied to it for a time period slightly longer that the time period applied to ring one, if ring two requires that greater amount of molecule rotation. If less molecule rotation is required in ring two that in ring one, then a shorter time period and/or a smaller voltage than was applied to ring one can be temporarily applied. Subsequent rings can have varying high-voltage-times based upon the required time needed to reach the desired angle. The high-voltage-time can be determined by high-speed photography of the lens, such as under cross-polarized filters with backlighting, while approximately 20 volts is applied. As the molecules begin to rotate the rings can appear to become lighter and lighter, which can correlate to the desired rotation angle. The time to reach the desired rotation angle can be determined upon playback of the high-speed photography, and the time to apply the high voltage per ring can be determined. The result of this voltage strategy can be that the lens switched very quickly to its desired optical power. When the power is removed, the liquid crystal molecules can relax back to their substantially parallel-to-the-substrate position, but can take longer to do that. Therefore, the lens can be used to take the desired sequence of images starting in the unpowered or low powered state, and quickly transitioning to the various optical power states that are created by increasing the voltage. The lens need not be used to take a sequence of images while it is transitioning from a high power state to a lower power state because the change-of-focus-times might be too long.

FIG. 1 shows an exemplary layout of an exemplary system, shown from a top-down or "bird's eye" view of a scene. Image sensor 5 has conventional focus optical lens 10 and electro-active lens 15 positioned appropriately to bring objects into focus. Lines 20 indicate the limits of a potential field of view of this exemplary embodiment. Objects 25, 30, and 35 are located in the scene and/or in the field of view of this exemplary system, with close object 25 being nearest to lenses 10 and 15, far object 35 being the furthest away from the lenses, and middle object 30 being at an intermediate distance from the lenses.

Figure 2:
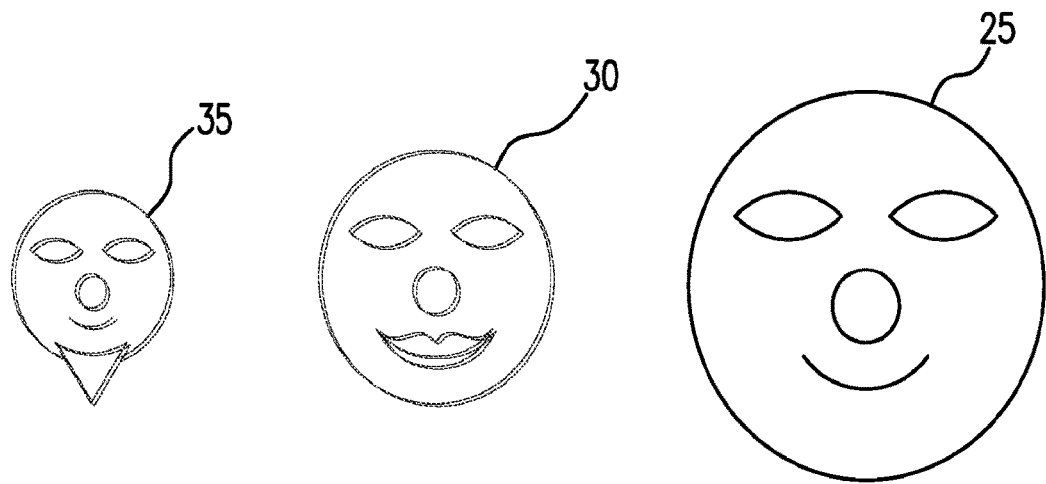
FIG. 2 is a view of an exemplary scene.

FIG. 2 shows how the objects of the scene would typically appear in a picture captured by image sensor 5 if the lenses 10 and 15 were adjusted to focus best upon near object 25. Near object 25 would appear with highest contrast and sharpest edges, while middle object 30 would appear with less contrast and less sharpness in the edges, while far object 35 would appear with the least contrast and least edge sharpness.

Figure 3:
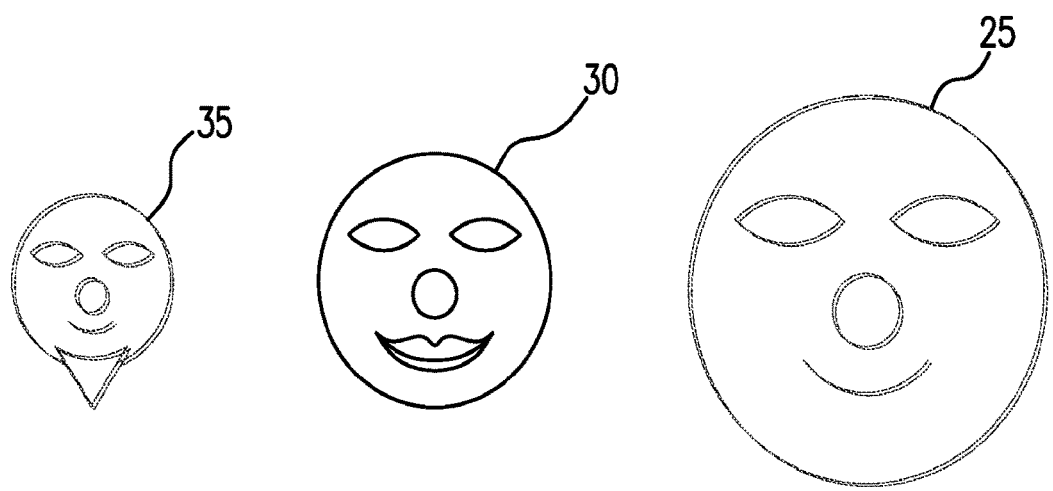
FIG. 3 is a view of an exemplary scene.

FIG. 3 shows how the objects of the scene would typically appear in a picture captured by image sensor 5 if the lenses 10 and 15 were adjusted to focus best upon middle object 30. Middle object 30 would appear with highest contrast and sharpest edges, while far object 35 would appear with less contrast and less sharpness in the edges, and near object 25 would appear also with less contrast and less edge sharpness.

Figure 4:
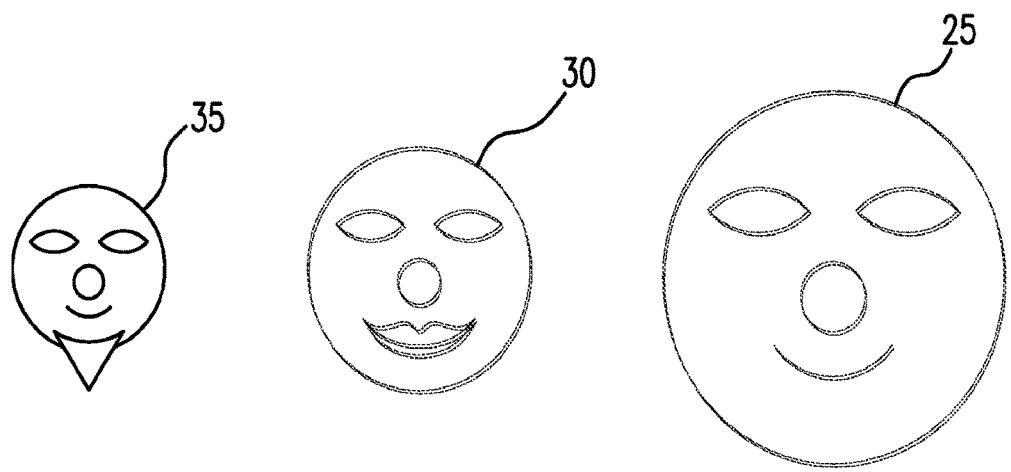
FIG. 4 is a view of an exemplary scene.

FIG. 4 shows how the objects of the scene would typically appear in a picture captured by image sensor 5 if the lenses 10 and 15 were adjusted to focus best upon far object 35. Far object 35 would appear with highest contrast and sharpest edges, while middle object 30 would appear with less contrast and less sharpness in the edges, and near object 25 would appear with least contrast and least edge sharpness.

Using certain exemplary embodiments, the user can point the camera in the direction of the one or more objects in a scene to be photographed, ensure that those objects are within the field of view of the camera system, then press the shutter button. Electro-active lens 15 can be preset to be initially focused upon far objects in its "ready to shoot" mode. Image sensor 5 can capture the first image of the scene, and/or complete the image acquisition, typically in less than approximately 20 to approximately 50 milliseconds. Electro-active lens 15 then can change focus from the far location (typically 3 meters or more distant, with a depth of focus from 3 meters to infinity) to a middle location (typically 1 meter distant with a depth of focus of 0.3 meters), typically in approximately 5 to approximately 20 milliseconds. Then image sensor 5 can acquire and record a second image of the scene, then electro-active lens 15 can change focus to the near location (typically 0.2 meters distant with a depth of focus of 0.1 meter) and image sensor 5 can acquire and record a third image of the scene.

Although the above description of these exemplary embodiments identifies three levels of focus and a range of potential electro-active lens switching speeds and a range of potential image acquisition speeds, it is understood one or more embodiments can utilize more or less focus points, electro-actives lenses having faster or slower focus change speeds, and/or image sensors having faster or slower acquisition speeds, etc. These capabilities can be useful because, for example, faster acquisition speeds can lead to a lower likelihood that undesired motion effects, such as blurring and/or smearing, will be observed in the acquired images.

Certain exemplary embodiments can examine and calculate the "best edge" of the object being focused upon, and trigger the image acquisition when the best edge is detected at the various focus points (this can be a shortcoming of this type of focus method because when the user has an object in the center of the field of view without sharply contrasting edges, the autofocus likely will not function).

After the photograph has been taken and the multiple images of a scene stored, post-processing software can be manually and/or automatically utilized to access in turn one or each photograph from the multiple image set acquired, and/or choose a region of the images of the scene to focus upon. The post-processing software, which can be resident on the camera and/or another information device (such as a smartphone, tablet, display, personal computer, server, etc.) can utilize one or more focusing algorithms known to those in the art of camera autofocus, and/or can apply those algorithm(s) to the chosen region (e.g., a 3 mm×4 mm region located 0.03 mm horizontal and 1.25 mm vertical from a common origin (e.g., upper left corner) for each image) of all or a pre-selected portion of the stored images. Once the image with the best focus in that particular region is determined, that automatically determined image can be presented to the user via the display, giving the illusion of the image "coming into focus." An example of an autofocus algorithm is the Sobel Edge Detection algorithm, which is available for use through the Matlab programming software package with the image processing toolbox available from Mathworks, Inc., and which is described in the following documents, of which each is incorporated by reference herein in its entirety:

U.S. patent application 20080165206;
U.S. Pat. No. 7,283,663;
U.S. patent application 20110217030; and
U.S. Pat. No. 8,264,591.

Figure 5:
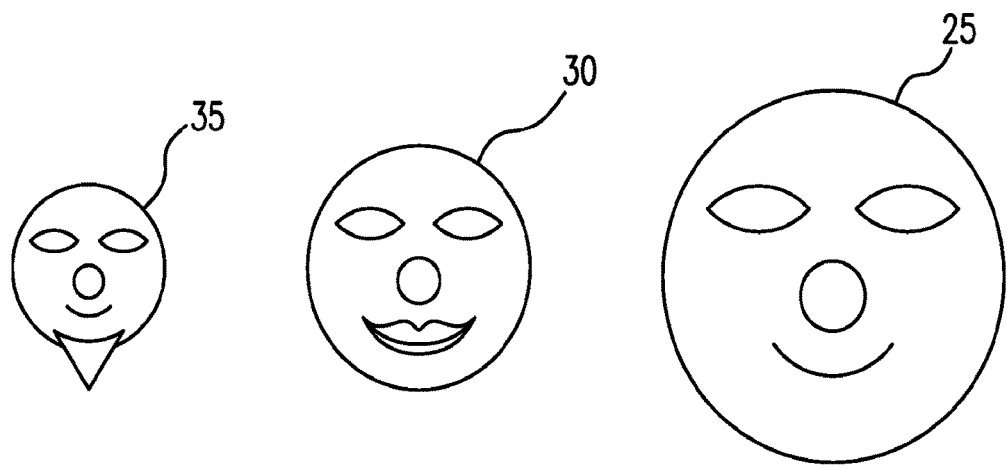
FIG. 5 is a view of an exemplary scene.

FIG. 5 shows how it is also possible, with more sophisticated image processing algorithms known to those skilled in the art of image processing, to stitch together sections of images of one or more scenes to create a single image from the multiple images, utilizing sections from each distinct image that are in best focus, creating a single image, potentially of a single scene, where it appears that near, middle and far objects are simultaneously in focus. Such image processing techniques are available in the Matlab programming software package with the image processing toolbox from Mathworks, Inc.

Figure 6:
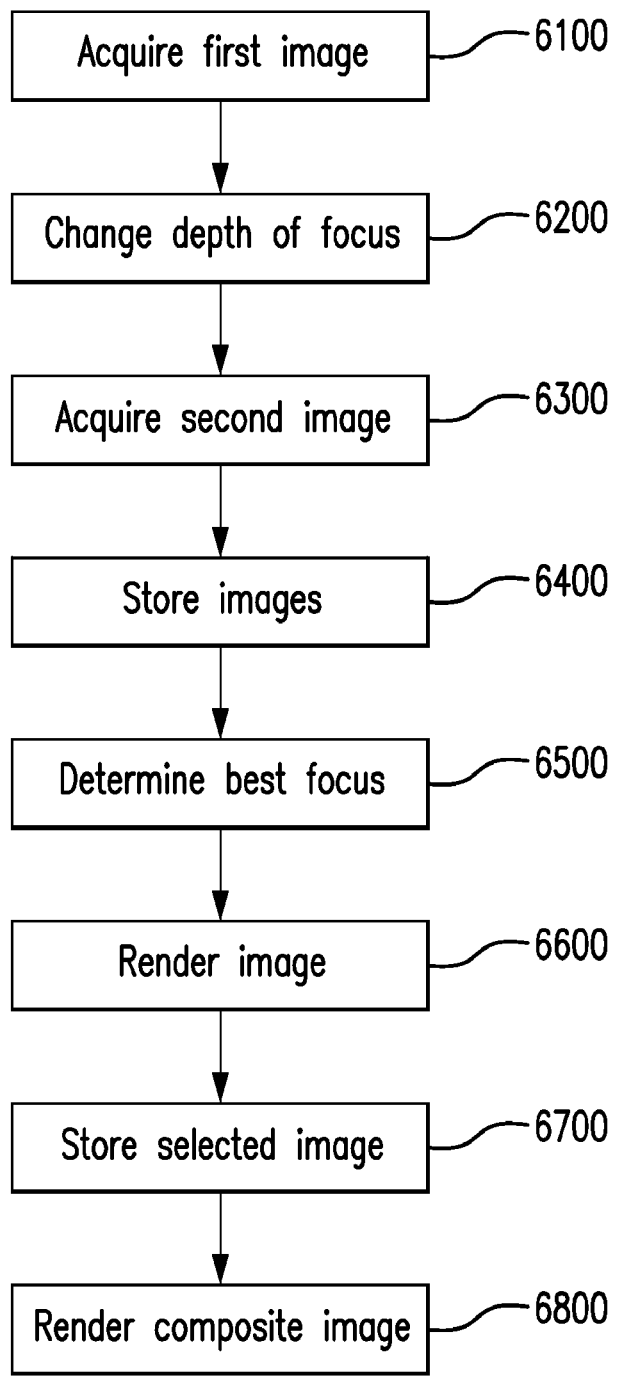
FIG. 6 is a flowchart of an exemplary embodiment of a method.

FIG. 6 is a flowchart of an exemplary embodiment of a method 6000. At activity 6100, via a photographic device comprising an electro-active lens and an image sensor that is optically aligned with the electro-active lens and a scene, upon receiving an acquisition initiation command, a first image of a scene can be acquired, that first image having a first focal depth. At activity 6200, a depth of focus of the electro-active lens automatically can be changed. At activity 6300, a second image of a scene can be acquired, that second image having a second focal depth that is different than the first focal depth. At activity 6400, the images can be automatically stored. At activity 6500, which of the two (or more) images has the best focus (such as for a particular object, focal depth, and/or region of the images and/or scene, etc.), can be determined. At activity 6600, a selected image can be automatically rendered, that image having the best focus (such as for a particular object, focal depth, and/or region of the images and/or scene, etc.). At activity 6700, a selected image can be stored, such as outside of the photographic device. At activity 6800, a composite image, such as an image that comprises a plurality of automatically selected regions from the at least two images, each selected region having a best focus with respect to a corresponding region of each of the at least two images, can be automatically rendered.

Figure 7:
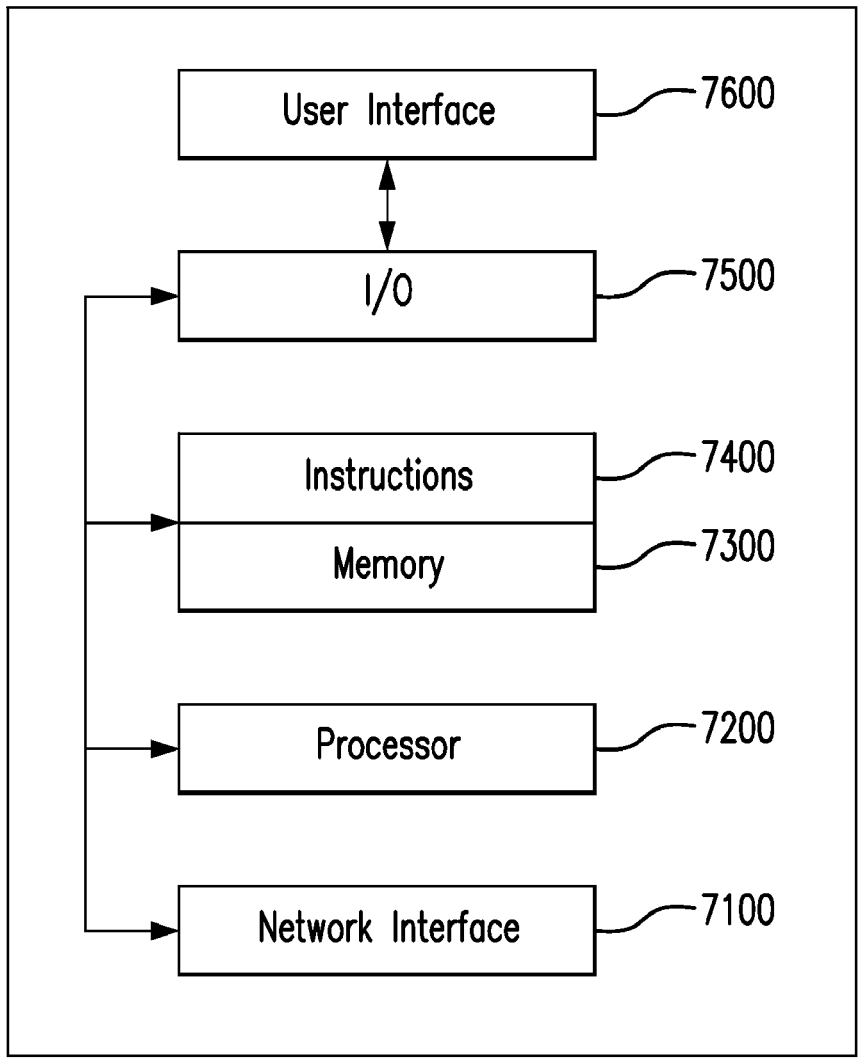
FIG. 7 is a block diagram of an exemplary embodiment of an information device.

FIG. 7 is a block diagram of an exemplary embodiment of an information device 7000, which in certain operative embodiments can comprise, for example, photographic device. Information device 7000 can comprise any of numerous transform circuits, which can be formed via any of numerous communicatively-, electrically-, magnetically-, optically-, fluidically-, and/or mechanically-coupled physical components, such as for example, one or more network interfaces 7100, one or more processors 7200, one or more memories 7300 containing instructions 7400, one or more input/output (I/O) devices 7500, and/or one or more user interfaces 7600 coupled to I/O device 7500, etc.

In certain exemplary embodiments, via one or more user interfaces 7600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, via a device comprising an electro-active lens, automatically acquiring at least two images of a scene.

For example, certain exemplary embodiments can provide a method comprising:
- via a photographic device comprising an electro-active lens and an image sensor that is optically aligned with the electro-active lens and a scene, upon receiving an acquisition initiation command, automatically acquiring at least two images of the scene without substantially changing a field of view, orientation, or location of the electro-active lens or the image sensor, each of the at least two images having a different focal depth;
- automatically rendering a selected image from the at least two images, the selected image having a best focus, with respect to any other of the at least two images, for a predetermined region of the at least two images;
- automatically changing a depth of focus of the electro-active lens between acquisition of a first image from the at least two images and a second image from the at least two images;
- automatically storing the at least two images;
- automatically determining the predetermined region;
- automatically determining which of the at least two images has the best focus;
- automatically storing the selected image;
- automatically storing the selected image outside the photographic device; and/or
- automatically rendering a composite image that comprises a plurality of automatically selected regions from the at least two images, each selected region having a best focus with respect to a corresponding region of each of the at least two images;

wherein:
- the selected image is rendered via a display of the photographic device;
- the selected image is rendered via a display of an information device; the selected image is automatically selected by an image selection circuit of the photographic device;
- the selected image is automatically selected by an image selection circuit of an information device;
- a focus of each image from the at least two images is automatically determined by an image focus quality circuit of the photographic device;
- a focus of each image from the at least two images is automatically determined by an image focus quality circuit of an information device;
- the focal point of at least one image from the at least two images is greater than 3 meters;
- the focal point of at least one image from the at least two images is between approximately 1 meter and approximately 3 meters;
- the focal point of at least one image from the at least two images is between approximately 0.2 meters and approximately 1 meter;
- the selected image is manually determined;
- a selected object in the predetermined region has one or more edges that are sharpest in the selected image compared to any other of the at least two images;
- a selected object in the predetermined region has one or more edges that are sharpest in the selected image compared to any other of the at least two images, the one or more edges automatically determined by a Sobel Edge Detection method;
- a selected object in the predetermined region has a contrast that is highest in the selected image compared to any other of the at least two images; and/or
- an elapsed time between completing an acquisition of a first image from the at least two images and changing focus prior to beginning an acquisition of a second image from the at least two images is between approximately 2 milliseconds and 20 milliseconds.

As another example, certain exemplary embodiments can provide a device comprising:
- an electro-active lens; and/or
- an image sensor that is optically aligned with the electro-active lens and a scene, the image sensor adapted to:
  - upon receiving an acquisition initiation command, automatically acquire at least two images of the scene without substantially changing a field of view, orientation, or location of the electro-active lens or the image sensor, each of the at least two images having a different focal depth; and/or
  - automatically render a selected image from the at least two images, the selected image having a best focus, with respect to any other of the at least two images, for a predetermined region of the at least two images.

As yet another example, certain exemplary embodiments can provide a machine-readable medium storing machine-implementable instructions for activities comprising:
- via a photographic device comprising an electro-active lens and/or an image sensor that is optically aligned with the electro-active lens and a scene:
  - upon receiving an acquisition initiation command, automatically acquiring at least two images of the scene without substantially changing a field of view, orientation, or location of the electro-active lens or the image sensor, each of the at least two images having a different focal depth; and/or
  - automatically rendering a selected image from the at least two images, the selected image having a best focus, with respect to any other of the at least two images, for a predetermined region of the at least two images.

As still another example, certain exemplary embodiments can provide a circuit comprising:
- operative in a photographic device comprising an electro-active lens and an image sensor that is optically aligned with the electro-active lens and a scene:
  - a first sub-circuit adapted to, upon receiving an acquisition initiation command, automatically acquire at least two images of the scene without substantially changing a field of view, orientation, or location of the electro-active lens or the image sensor, each of the at least two images having a different focal depth; and/or a second sub-circuit adapted to automatically render a selected image from the at least two images, the selected image having a best focus, with respect to any other of the at least two images, for a predetermined region of the at least two images.

Definitions

When the following terms are used substantively herein, the accompanying definitions apply. These terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

- a—at least one.
- aberration—one or more limitations and/or defects in an optical component, such as a lens and/or mirror, that is contacted by a plurality of light rays, such limitations and/or defects preventing the light rays from converging at one focus and potentially due to, e.g., the optical component comprising one or more surfaces that are not perfectly planar, such as one or more spherical surfaces.
- acquire—to obtain, get, import, receive, and/or gain possession of
- acquisition—the act and/or result of acquiring.
- across—from one side to another.
- activity—an action, act, step, and/or process or portion thereof
- adapted to—suitable, fit, and/or capable of performing a specified function.
- adapter—a device used to effect operative compatibility between different parts of one or more pieces of an apparatus or system.
- adjust—to change so as to match, fit, adapt, conform, and/or be in a more effective state.
- align—to adjust substantially into a proper orientation and/or location with respect to another thing.
- and/or—either in conjunction with or in alternative to.
- any—one, some, every, and/or all without specification.
- apparatus—an appliance or device for a particular purpose.
- approximately—about and/or nearly the same as.
- associate—to join, connect together, and/or relate.
- at least—not less than, and possibly more than.
- auto-focus—a system in a camera that automatically adjusts the lens so that the object being photographed is in focus, often using a time delay associated with reflecting infrared light off of the object to estimate the distance of the object from the camera.
- automatic—performed via an information device in a manner essentially independent of influence and/or control by a user. For example, an automatic light switch can turn on upon "seeing" a person in its "view", without the person manually operating the light switch.
- beam of light—a projection of light radiating from a source.
- beginning—a starting point.
- best—surpassing all others in excellence, achievement, and/or quality; most excellent.
- between—in a separating interval and/or intermediate to.
- Boolean logic—a complete system for logical operations.
- border—to be located and/or positioned adjacent to an outer edge, surface, and/or extent of an object.
- bound—(n) a boundary, limit, and/or further extent of; (v) to limit an extent.
- bus—an electrical conductor that makes a common connection between a plurality of circuits.
- by—via and/or with the use and/or help of.
- camera—a device often comprising a lightproof enclosure having an aperture with a lens through which a still and/or moving image of an object is focused and recorded on a photosensitive film, plate, tape, and/or or sensor coupled to an electronic and/or optical memory device (e.g., RAM, EEPROM, flash memory, magnetic disk, optical disk, etc.).
- camera-to-object (CTO) distance—a measure of the physical separation between an identified portion of a camera and an object being photographed by that camera.
- can—is capable of, in at least some embodiments.
- capture—to sense, receive, obtain, enter, store, and/or record information and/or data in memory.
- cause—to bring about, provoke, precipitate, produce, elicit, be the reason for, result in, and/or effect.
- change—(v.) to cause to be different; (n.) the act, process, and/or result of altering or modifying.
- circuit—a physical system comprising, depending on context: an electrically conductive pathway, an information transmission mechanism, and/or a communications connection, the pathway, mechanism, and/or connection established via a switching device (such as a switch, relay, transistor, and/or logic gate, etc.); and/or an electrically conductive pathway, an information transmission mechanism, and/or a communications connection, the pathway, mechanism, and/or connection established across two or more switching devices comprised by a network and between corresponding end systems connected to, but not comprised by the network.
- co-operate—to work, act, and/or function together and/or in harmony, as opposed to separately and/or in competition.
- command—a signal that initiates an activity and/or operation defined by an instruction.
- compare—to examine in order to note similarities and/or differences in relation to something else.
- complete—to provide required and/or requested information.
- composite—made of diverse materials and/or information, each of which is identifiable, at least in part, in the final product.
- comprising—including but not limited to.
- comprises—includes, but is not limited to, what follows.
- concentric—having a common central axis.
- conductor—an electrically conductive material and/or component adapted to apply a voltage to an electro-active material.
- configure—to make suitable or fit for a specific use or situation.
- connect—to join or fasten together.
- contact—to physically touch and/or come together.
- containing—including but not limited to.
- contiguous—neighboring and/or adjacent.
- contrast—a difference in brightness between the light and dark areas of a picture, such as a photographic and/or video image.
- controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, Calif., and/or the HCO8 series from Motorola of Schaumburg, Ill. In another embodiment, the controller can be an Application Specific Integrated Circuit (ASIC) or a Field Programmable Gate Array (FPGA) that has been designed to implement in its hardware and/or firmware at least a part of an embodiment disclosed herein.

convert—to transform, adapt, and/or change.

corresponding—related, associated, accompanying, similar in purpose and/or position, conforming in every respect, and/or equivalent and/or agreeing in amount, quantity, magnitude, quality, and/or degree.

couple—to join, connect, and/or link by any known approach, including mechanical, fluidic, acoustic, electrical, magnetic, and/or optical, etc. approaches.

coupleable—capable of being joined, connected, and/or linked together.

coupling—linking in some fashion.

create—to bring into being.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the outline, form, and/or structure of.

deposit—to put, lay, place, position, and/or set down; and/or to fasten, fix, and/or secure.

depth of focus—a distance over which an image plane can be displaced while a single object plane remains in acceptably sharp focus; approximately the same as the camera-to-object distance.

detection—an act of sensing or perceiving.

determine—to find out, obtain, calculate, decide, deduce, ascertain, and/or come to a decision, typically by investigation, reasoning, and/or calculation.

device—a machine, manufacture, and/or collection thereof different—changed, distinct, and/or separate.

diffraction—the bending of a light ray in passing an edge formed by contiguous opaque and transparent edges.

digital—non-analog and/or discrete.

display—(v.) to visually render. (n.) a visual representation of something and/or an electronic device that represents information in visual form.

distance—a measure of physical separation.

diverge—to go or extend in different directions from a common point.

each—every one of a group considered individually.

edge—a periphery, border, and/or boundary.

elapsed—passed and/or having passed by.

electric—powered by electricity.

electrically—of, relating to, producing, or operated by electricity.

electrically coupled—connected in a manner adapted to allow a flow of electricity therebetween.

electro-active—a branch of technology concerning the interaction between various properties and electrical and/or electronic states of materials and/or involving components, devices, systems, and/or processes that operate by modifying the certain properties of a material by applying to it an electrical and/or magnetic field. Sub-branches of this technology include, but are not limited to, electro-optics.

electro-active element—a component that utilizes an electro-active effect, such as an electro-active filter, reflector, lens, shutter, liquid crystal retarder, active (i.e., non-passive) polarity filter, electro-active element that is movable via an electro-active actuator, and/or conventional lens movable by an electro-active actuator.

electro-optic—a branch of technology concerning the interaction between the electromagnetic (optical) and the electrical (electronic) states of materials and/or involving components, devices, systems, and/or processes that operate by modifying the optical properties of a material by applying to it an electrical field.

electrode—an electrically conducting element that emits and/or collects electrons and/or ions and/or controls their movement by means of an electric field applied to it.

emanate—to emit, radiate, and/or shine.

estimate—(n.) a calculated value approximating an actual value; (v) to calculate and/or determine approximately and/or tentatively.

etch—to wear away the surface of material (such as a metal, glass, etc.) by chemical action, such as the action of an acid.

far—a CTO distance of at least approximately 3 or more meters.

field—a region of space characterized by a physical property, such as gravitational or electromagnetic force or fluid pressure, having a determinable value at every point in the region.

field of view—a range of space over which a camera can obtain an image and/or the angle between two rays passing through the perspective center (rear nodal point) of a camera lens to the two opposite sides of the format.

first—an initial element in a set.

flat—having a substantially planar major face and/or having a relatively broad surface in relation to thickness or depth.

focal depth—the image-side conjugate of depth of field.

focus—to cause energy and/or light to concentrate and/or converge.

form—to produce, make, create, generate, construct, and/or shape.

Fresnel lens—a thin optical lens comprising concentric rings of segmental lenses.

from—used to indicate a source.

further—in addition.

generate—to create, produce, give rise to, and/or bring into existence.

gradient—a rate of change with respect to distance of a variable quantity.

greater than—larger and/or more than.

grid—a network of lines, real or conceptual, that cross each other to form a series of regular shapes.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

having—including but not limited to.

highest—greatest in an ordering.

human-machine interface—hardware and/or software adapted to render information to a user and/or receive information from the user; and/or a user interface.

illuminate—to provide and/or brighten with light.

image—an at least two-dimensional representation of an object, entity, and/or phenomenon. Multiple images can be presented in a predetermined and timed sequence to recreate and/or produce an appearance of movement.

impinge—to collide and/or strike.

including—including but not limited to.

index of refraction—a measure of the extent to which a substance slows down light waves passing through it. The index of refraction of a substance is equal to the ratio of the velocity of light in a vacuum to its speed in that substance. Its value determines the extent to which light is refracted when entering or leaving the substance.

indium tin oxide—a solid solution of indium(III) oxide (In2O3) and tin(IV) oxide (SnO2), typically 90% In2O3, 10% SnO2 by weight, that is typically transparent and colorless in thin layers and can serve as a metal-like mirror in the infrared region of the electromagnetic spectrum. It is a widely used transparent conducting oxide due to its electrical conductivity and optical transparency. Thin films of indium tin oxide are most commonly deposited on surfaces by electron beam evaporation, physical vapor deposition, and/or a range of sputter deposition techniques.

individually—of or relating to a distinct entity.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone-like and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

initiation—a preparation for subsequent activities.

input/output (I/O) device—any device adapted to provide input to, and/or receive output from, an information device. Examples can include an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, switch, relay, haptic device, vibrator, tactile simulator, and/or tactile pad, potentially including a port to which an I/O device can be attached or connected.

install—to connect or set in position and prepare for use.

instructions—directions, which can be implemented as hardware, firmware, and/or software, the directions adapted to perform a particular operation and/or function via creation and/or maintenance of a predetermined physical circuit.

insulating—having a substantial resistance to the flow of electrical current.

layer—a continuous and relatively thin material, region, stratum, course, lamina, coating, and/or sheet having one or more functions. Need not have a constant thickness.

lens—a piece of transparent substance, often glass and/or plastic, having two opposite surfaces either both curved or one curved and one plane, used in an optical device for changing the convergence and/or focal point of light rays; and/or an optical device that transmits light and is adapted to cause the light to refract, concentrate, and/or diverge. A lens can be an ophthalmic lens, such as a spectacle lens, an intra ocular lens, and/or a contact lens.

light—electromagnetic radiation having a wavelength within a range of approximately 300 nanometers to approximately 1000 nanometers, including any and all values and subranges therebetween, such as from approximately 400 to approximately 700 nm, from the near infrared through the long wavelength, far infrared, and/or from the ultraviolet to X-rays and/or gamma rays.

light source—a device adapted to emit light responsive to an applied electrical current.

liquid—a body of matter that exhibits a characteristic readiness to flow, little or no tendency to disperse, and relatively high incompressibility, including pumpable and/or flowable slurries and/or suspensions.

liquid crystal—any of various liquids in which the atoms or molecules are regularly arrayed in either one dimension or two dimensions, the order giving rise to optical properties, such as anisotropic scattering, associated with the crystals.

locate—to place, set, find, and/or situate in a particular spot, region, and/or position.

location—a place where, and/or substantially approximating where, something physically exists.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0" +"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine-implementable instructions—directions adapted to cause a machine, such as an information device, to perform one or more particular activities, operations, and/or functions via forming a particular physical circuit. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain one or more machine-implementable instructions, data, and/or information. Examples include a memory device, punch card, player-piano scroll, etc.

manually—employing human energy.

match—to mirror, resemble, harmonize, fit, correspond, and/or determine a correspondence between, two or more values, entities, and/or groups of entities.

material—a substance and/or composition.

may—is allowed and/or permitted to, in at least some embodiments.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not pre-empting all uses of a fundamental principal.

middle—a CTO distance within a range of approximately 0.7 to approximately 1.3 meters.

millisecond—a one-thousandth of a second.

more—a quantifier meaning greater in size, amount, extent, and/or degree.

near—a CTO distance of less than approximately 0.2 meters.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, radio, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, 3G, 4G, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, Ethernet card, cable modem, digital subscriber line interface, bridge, hub, router, or other similar device, software to manage such a device, and/or software to provide a function of such a device.

non-overlapping—not extending over or covering a part of.

object—a discrete thing that is real, perceptible, and tangible.

offset—in a location near to but distinguishable from a given point or area.

operative—being in effect and/or operating.

opposing—opposite; against; being the other of two complementary or mutually exclusive things; placed or located opposite, in contrast, in counterbalance, and/or across from something else and/or from each other.

optical—of or relating to light, sight, and/or a visual representation.

orientation—a position relative to a reference.

other—a different and/or distinct entity and/or not the same as already mentioned and/or implied.

outside—beyond a range, boundary, and/or limit; and/or not within.

overlap—to extend over and cover a part of.

packet—a generic term for a bundle of data organized in a specific way for transmission, such as within and/or across a network, such as a digital packet-switching network, and comprising the data to be transmitted and certain control information, such as a destination address.

perceptible—capable of being perceived by the human senses.

perpendicular—intersecting at or forming substantially right angles; and/or substantially at a right angle with respect to an axis.

phase—a relationship in time between successive states and/or cycles of an oscillating and/or repeating system (such as an alternating electric current, one or more light waves, and/or a sound wave) and: a fixed reference point; the states of another system; and/or the cycles of another system.

photograph—(n) an image created by collecting and focusing reflected electromagnetic radiation. The most common photographs are those created of reflected visible wavelengths, producing permanent records of what the human eye can see. (v) to record an image.

photographic—pertaining to the recording of an image.

photolithography—a process whereby metallic foils, fluidic circuits, and/or printed circuits can be created by exposing a photosensitive substrate to a pattern, such as a predesigned structural pattern and/or a circuit pattern, and chemically etching away either the exposed or unexposed portion of the substrate.

photon—a particle representing a quantum of light and/or other electromagnetic radiation, the particle having zero rest mass and carrying energy proportional to the frequency of the radiation.

physical—tangible, real, and/or actual.

physically—existing, happening, occurring, acting, and/or operating in a manner that is tangible, real, and/or actual.

plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate. (v.) to indicate a position and/or direction of.

portion—a part, component, section, percentage, ratio, and/or quantity that is less than a larger whole. Can be visually, physically, and/or virtually distinguishable and/or non-distinguishable.

position—to put in place or position.

power—a measure of an ability of a vision system, eye, lens, and/or lens-assisted eye, to refract, magnify, separate, converge, and/or diverge; and/or a general term that may refer to any power such as effective, equivalent, dioptric, focal, refractive, surface, and/or vergence power.

pre-—a prefix that precedes an activity that has occurred beforehand and/or in advance.

predetermined—established in advance.

prior—before and/or preceding in time and/or order.

probability—a quantitative representation of a likelihood of an occurrence.

processor—a machine that utilizes hardware, firmware, and/or software and is physically adaptable to perform, via Boolean logic operating on a plurality of logic gates that form particular physical circuits, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/ or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmatically—of, relating to, or having a program and/or instructions.

project—to calculate, estimate, or predict.

provide—to furnish, supply, give, and/or make available.

quality—a characteristic, attribute, trait, and/or property.

radial—pertaining to that which radiates from and/or converges to a common center and/or has or is characterized by parts so arranged or so radiating.

receive—to get as a signal, take, acquire, and/or obtain.

recommend—to suggest, praise, commend, and/or endorse.

record—(v) to gather, capture, store, and/or preserve information on a tangible medium.

reduce—to make and/or become lesser and/or smaller.

region—an area and/or zone.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

request—to express a desire for and/or ask for.

resolution—a degree of sharpness of an image.

ring—a substantially toroidal object that can be imagined as having been generated by rotating a closed loop (e.g., ellipse, circle, irregular curve, polygon, etc.) about a fixed line external to the loop.

scene—a place where action occurs and/or where an object of interest is present; something seen by a viewer; and/or a view and/or prospect.

second—an element following a first element in a set.

select—to make a choice or selection from alternatives.

selection—(v.) the act of choosing and/or selecting and/or an assortment of things from which a choice can be made. (n.) a choice.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, magnetic flux, and/or electro-magnetic radiation, etc.) and convert that physical quantity into a signal. Examples include position sensors, proximity switches, stain gages, photo sensors, thermocouples, level indicating devices, speed sensors, accelerometers, electrical voltage indicators, electrical current indicators, on/off indicators, and/or flowmeters, etc.

separated—not touching and/or spaced apart by something.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

sharpness—acuteness and/or distinctness.

signal—(v) to communicate; (n) one or more automatically detectable variations in a physical variable, such as a pneumatic, hydraulic, acoustic, fluidic, mechanical, electrical, magnetic, optical, chemical, and/or biological variable, such as power, energy, pressure, flow-rate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that can encode information, such as machine-implementable instructions for activities and/or one or more letters, words, characters, symbols, signal flags, visual displays, and/or special sounds, etc., having prearranged meaning. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

solid angle—a three-dimensional angle, formed by three or more planes intersecting at a common point. Its magnitude is measured in steradians, a unitless measure. The corner of a room forms a solid angle, as does the apex of a cone; one can imagine an indefinite number of planes forming the smooth round surface of the cone all intersecting at the apex. Solid angles are commonly used in photometry.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

spherical—of, relating to, and/or having a shape approximating that of a sphere.

store—to place, hold, and/or retain data, typically in a memory.

structure—something made up of a number of parts that are held and/or put together in a particular way.

sub-circuit—a circuit that serves as a portion of another circuit.

substantially—to a great extent and/or degree.

substrate—an underlying material, region, base, stratum, course, lamina, coating, and/or sheet.

sufficiently—to a degree necessary to achieve a predetermined result.

support—to bear the weight of, especially from below.

surface—the outer boundary of an object and/or a material layer constituting and/or resembling such a boundary.

switch—(n.) a mechanical, electrical, and/or electronic device that opens and/or closes circuits, completes and/or breaks an electrical path, and/or selects paths and/or circuits; (v.) to: form, open, and/or close one or more circuits; form, complete, and/or break an electrical and/or informational path; alternate between electrically energizing and de-energizing; select a path and/or circuit from a plurality of available paths and/or circuits; and/or establish a connection between disparate transmission path segments in a network (or between networks); (n) a physical device, such as a mechanical, electrical, and/or electronic device, that is adapted to switch.

switching speed—the time required to change from one CTO distance to another.

system—a collection of mechanisms, devices, machines, articles of manufacture, processes, data, and/or instructions, the collection designed to perform one or more specific functions.

that—a pronoun used to indicate a thing as indicated, mentioned before, present, and/or well known.

time—a measurement of a point in a non-spatial continuum in which events occur in apparently irreversible succession from the past through the present to the future.

transform—to change in measurable: form, appearance, nature, and/or character.

transmit—to send as a signal, provide, furnish, and/or supply.

transparent—clear; characterized by conveying incident light without reflecting or absorbing a substantial portion of that light; and/or having the property of transmitting rays of light through its substance so that bodies situated beyond or behind can be distinctly seen.

unique—separate and distinct.

upon—immediately or very soon after; and/or on the occasion of user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc.

A user interface can include one or more haptic elements such as, for example, elements utilizing tactile stimulus, force, pressure, vibration, motion, displacement, temperature, etc.

variable-focus—having the quality of adjustable focus in a single specified optic.

vary—to change, alter, and/or modify one or more characteristics and/or attributes of.

via—by way of and/or utilizing.

voltage—(a.k.a., "potential difference" and "electro-motive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

wavefront—a surface containing points affected in substantially the same way by a wave at a substantially predetermined time.

weight—a value indicative of importance.

when—at a time and/or during the time at which.

wherein—in regard to which; and; and/or in addition to.

which—what particular one or ones.

with—accompanied by.

with respect to—in relation to and/or relative to.

without—lacking

Note

Various substantially and specifically practical and useful exemplary embodiments are described herein, textually and/or graphically, including the best mode, if any, known to the inventor(s), for implementing the described subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the described subject matter to be practiced other than as specifically described herein. Accordingly, as permitted by law, the described subject matter includes and covers all variations, details, and equivalents of that described subject matter. Moreover, as permitted by law, every combination of the herein described characteristics, functions, activities, substances, and/or structural elements, and all possible variations, details, and equivalents thereof, is encompassed by the described subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any described subject matter unless otherwise stated. No language herein should be construed as indicating any described subject matter as essential to the practice of the described subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of any claims presented herein or in any document claiming priority hereto) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into and clearly implied as being presented within the specification as if it were individually recited herein. For example, if a range of 1 to 10 is described, even implicitly, unless otherwise stated, that range necessarily includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) described herein or appearing in a claim is followed by a drawing element number, that drawing element number is exemplary and non-limiting on the description and claim scope.

No claim of this document or any document claiming priority hereto is intended to invoke paragraph six of 35 USC 112 unless the precise phrase "means for" is followed by a gerund.

Any information in any material (e.g., a United States patent, United States patent application, book, article, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto (including any patent application claiming priority hereto) any reference to any claimed subject matter is intended to reference the precise language of the then-pending claimed subject matter at that particular point in time only.

Accordingly, every portion (e.g., title, field, background, summary, description, abstract, drawing figure, etc.) of this document, and any provided definitions of the phrases used herein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A method comprising:
    via a photographic device comprising a liquid crystal electro-active lens and an image sensor that is optically aligned with the electro-active lens and a scene, upon receiving an acquisition initiation command, automatically acquiring at least two images of the scene without changing a field of view, orientation, or location of the electro-active lens or the image sensor, each image of the at least two images having a different focal depth, the scene comprising a plurality of predetermined regions, each image from the at least two images uniquely having a predetermined best focus for a corresponding predetermined region from the plurality of predetermined regions in comparison to the same predetermined region in the remaining images of the at least two images, each image of the at least two images acquired via a sequential plurality of changes in a voltage applied to the electro-active lens, each change from the sequential plurality of the changes involving, changing from a corresponding switching voltage to a holding voltage, the switching voltage higher than the holding voltage, each change from the sequential plurality of changes having a higher holding voltage than the previous holding voltage; and
    rendering a selected image from the at least two images, the selected image having a best focus, with respect to any other of the at least two images, for a predetermined region of the at least two images.

2. The method of claim 1, further comprising:
    automatically changing a depth of focus of the electro-active lens between acquisition of a first image from the at least two images and a second image from the at least two images.

3. The method of claim 1, further comprising:
    automatically storing the at least two images.

4. The method of claim 1, further comprising:
    automatically determining the predetermined region.

5. The method of claim 1, further comprising:
    automatically determining which of the at least two images has the best focus.

6. The method of claim 1, further comprising:
    automatically storing the selected image.

7. The method of claim 1, further comprising:
    automatically storing the selected image outside the photographic device.

8. The method of claim 1, further comprising:
    automatically rendering a composite image that comprises a plurality of automatically selected regions from the at least two images, each selected region having a best focus with respect to a corresponding region of each of the at least two images.

9. The method of claim 1, wherein:
    the selected image is rendered via a display of the photographic device.

10. The method of claim 1, wherein:
    the selected image is rendered via a display of an information device.

11. The method of claim 1, wherein:
    the selected image is automatically selected by an image selection circuit of the photographic device.

12. The method of claim 1, wherein:
    the selected image is automatically selected by an image selection circuit of an information device.

13. The method of claim 1, wherein:
    a focus of each image from the at least two images is automatically determined by an image focus quality circuit of the photographic device.

14. The method of claim 1, wherein:
    a focus of each image from the at least two images is automatically determined by an image focus quality circuit of an information device.

15. The method of claim 1, wherein:
    the focal point of at least one image from the at least two images is greater than 3 meters.

16. The method of claim 1, wherein:
    the focal point of at least one image from the at least two images is between approximately 1 meter and approximately 3 meters.

17. The method of claim 1, wherein:
    the focal point of at least one image from the at least two images is between approximately 0.2 meters and approximately 1 meter.

18. The method of claim 1, wherein:
    the selected image is manually determined.

19. The method of claim 1, wherein:
    a selected object in the predetermined region has one or more edges that are sharpest in the selected image compared to any other of the at least two images.

20. The method of claim 1, wherein:
    a selected object in the predetermined region has one or more edges that are sharpest in the selected image compared to any other of the at least two images, the one or more edges automatically determined by a Sobel Edge Detection method.

21. The method of claim 1, wherein:
    a selected object in the predetermined region has a contrast that is highest in the selected image compared to any other of the at least two images.

22. The method of claim 1, wherein:
    an elapsed time between completing an acquisition of a first image from the at least two images and changing focus prior to beginning an acquisition of a second image from the at least two images is between approximately 2 milliseconds and 20 milliseconds.

23. A device comprising:
    a liquid crystal electro-active lens; and
    an image sensor that is optically aligned with the electro-active lens and a scene, the image sensor adapted to:
        upon receiving an acquisition initiation command, automatically acquire at least two images of the scene without changing a field of view, orientation, or location of the electro-active lens or the image sensor, each image of the at least two images having a different focal depth, the scene comprising a plurality of predetermined regions, each image from the at least two images uniquely having a predetermined best focus for a corresponding predetermined region from the plurality of predetermined regions in comparison to the same predetermined region in the remaining images of the at least two images, each image of the at least two images acquired via a sequential plurality of changes in a voltage applied to the electro-active lens, each change from the sequential plurality of the changes involving changing from a corresponding switching voltage to a holding voltage, the switching voltage higher than the holding voltage, each change from the sequential plurality of changes having a higher holding voltage than the previous holding voltage; and render a selected image from the at least two images, the selected image having a best focus, with respect to any other of the at least two images, for a predetermined region of the at least two images.

24. A non-transitory machine-readable medium storing machine-implementable instructions for activities comprising:

via a photographic device comprising a liquid crystal electro-active lens and an image sensor that is optically aligned with the electro-active lens and a scene:

upon receiving an acquisition initiation command, automatically acquiring at least two images of the scene without changing a field of view, orientation, or location of the electro-active lens or the image sensor, each image of the at least two images having a different focal depth, the scene comprising a plurality of predetermined regions, each image from the at least two images uniquely having a predetermined best focus for a corresponding predetermined region from the plurality of predetermined regions in comparison to the same predetermined region in the remaining images of the at least two images, each image of the at least two images acquired via a sequential plurality of changes in a voltage applied to the electro-active lens, each change from the sequential plurality of the changes involving changing from a corresponding switching voltage to a holding voltage, the switching voltage higher than the holding voltage, each change from the sequential plurality of changes having a higher holding voltage than the previous holding voltage; and automatically rendering a selected image from the at least two images, the selected image having a best focus, with respect to any other of the at least two images, for a predetermined region of the at least two images.

25. A circuit comprising:

operative in a photographic device comprising a liquid crystal electro-active lens and an image sensor that is optically aligned with the electro-active lens and a scene:

a first sub-circuit adapted to, upon receiving an acquisition initiation command, automatically acquire at least two images of the scene without changing a field of view, orientation, or location of the electro-active lens or the image sensor, each image of the at least two images having a different focal depth, the scene comprising a plurality of predetermined regions, each image from the at least two images uniquely having a predetermined best focus for a corresponding predetermined region from the plurality of predetermined regions in comparison to the same predetermined region in the remaining images of the at least two images, each image of the at least two images acquired via a sequential plurality of changes in a voltage applied to the electro-active lens, each change from the sequential plurality of the changes involving changing from a corresponding switching voltage to a holding voltage, the switching voltage higher than the holding voltage, each change from the sequential plurality of changes having a higher holding voltage than the previous holding voltage; and a second sub-circuit adapted to render a selected image from the at least two images, the selected image having a best focus, with respect to any other of the at least two images, for a predetermined region of the at least two images.

26. The method of claim 1, wherein:

the plurality of concentric ring electrodes are each made from a clear, electrically conductive material.

* * * * *